United States Patent [19]

Kraus et al.

[11] 4,171,948

[45] Oct. 23, 1979

[54] SLAG HANDLING APPARATUS

[75] Inventors: Richard B. Kraus; Albert Musschoot, both of Barrington, Ill.

[73] Assignee: General Kinematics Corporation, Barrington, Ill.

[21] Appl. No.: 864,927

[22] Filed: Dec. 27, 1977

[51] Int. Cl.$^2$ ............................................. F27D 15/02
[52] U.S. Cl. ....................................... 432/85; 266/232
[58] Field of Search ................... 432/85; 209/17, 345, 209/328; 266/232

[56] References Cited

U.S. PATENT DOCUMENTS

| | | | |
|---|---|---|---|
| 3,064,806 | 11/1962 | Hukki | 209/17 |
| 3,335,861 | 8/1967 | Musschoot et al. | 209/345 |

Primary Examiner—John J. Camby
Attorney, Agent, or Firm—Wegner, Stellman, McCord, Wiles & Wood

[57] ABSTRACT

This apparatus provides a slag handling system wherein slag is transported directly from a cupola furnace to a tank of water. The bottom of the tank slopes upwardly from a lower end to an upper end, and the tank forms part of a vibratory conveyor. The water in the tank is maintained at a level below the upper end of the material-supporting surface of the conveyor so that slag exiting from the cupola is quenched by the water and then conveyed upwardly through and out of the water for discharge from the upper end of the material-carrying surface.

3 Claims, 1 Drawing Figure

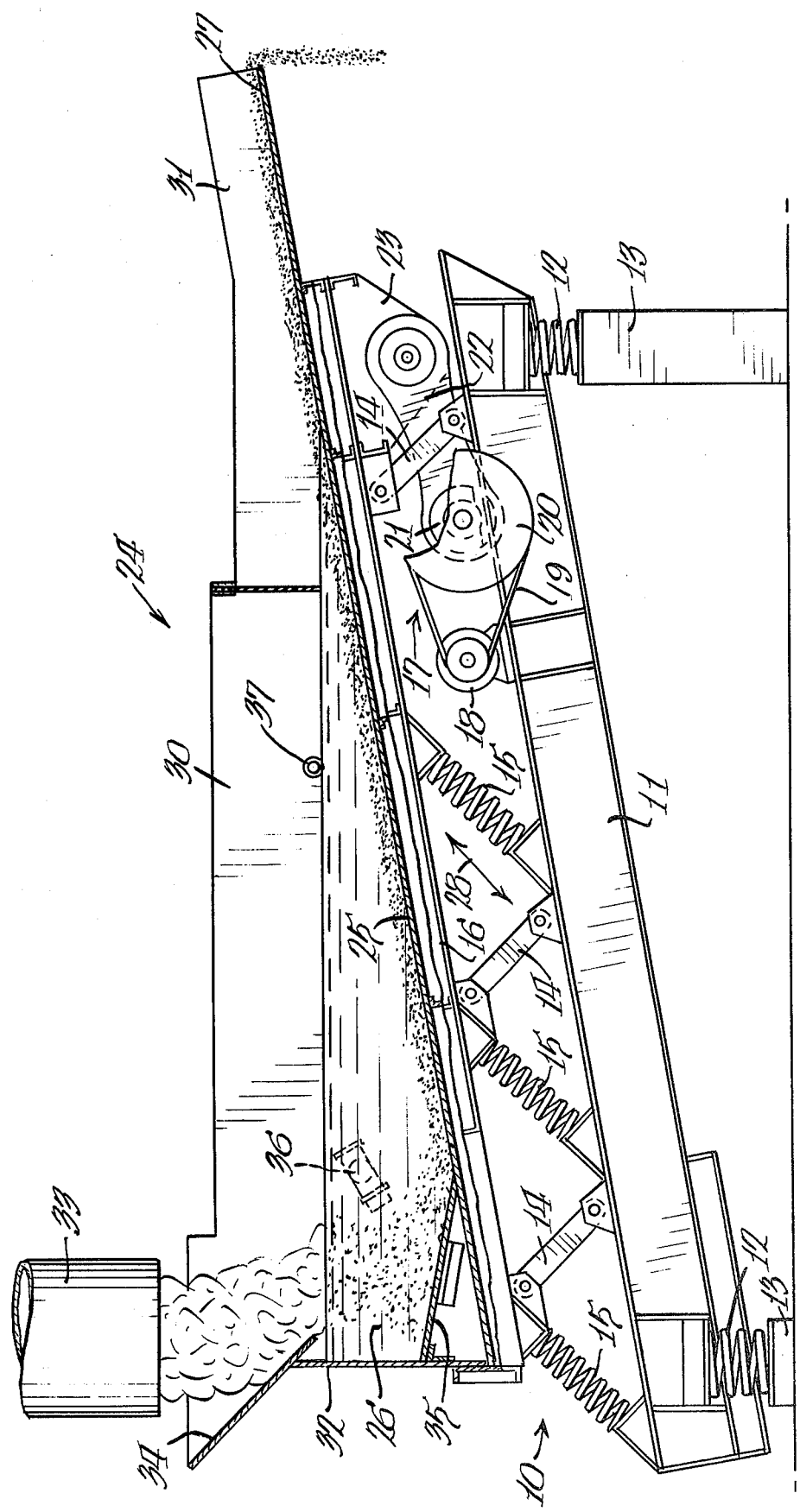

SLAG HANDLING APPARATUS

BACKGROUND OF THE INVENTION

Cupola furnaces for the manufacture of steel have been used for many years. In such systems, ore, limestone and coke are introduced into a cupola furnace and the coke is burned. When the operation is concluded, molten slag floating on the surface of the melted iron is drawn off and subsequently the iron is removed. The temperature of the slag at this point is in the neighborhood of 2000° F. and it has been the practice to pour the slag into large containers or buckets in which the slag may cool. The slag then, being a waste product, must be disposed of in some manner, and in one system the slag is broken up into small particles and used for road surfacing and the like.

SUMMARY OF THE INVENTION

In the present invention, molten slag is dumped from the cupola into a large container of water. As a result, the slag fragments instantly and thus is converted into usable form. The quenching water is carried by a vibratory conveyor including a material-carrying surface slanting upwardly from a lower end to an upper end. The material-carrying surface may form the bottom of the tank of water, which tank is three-sided, the open end of the tank being below the upper end of the material-carrying surface. As a result, fragmented slag is conveyed upwardly by vibratory conveying movement through and out of the body of water in the tank and is discharged off the upper end of the material-carrying surface. At this point, the slag is cooled sufficiently for handling while still normally is warm enough to evaporate any moisture film remaining on its surface. Thus, in effect, the slag is ready for immediate use without further treatment.

DESCRIPTION OF THE DRAWING

The drawing is a side elevational view, partially broken away for clarity of illustration, of an apparatus embodying the invention.

DESCRIPTION OF THE PREFERRED EMBODIMENT

Referring now to the drawings, there is shown a vibratory conveyor 10 of the general construction and arrangement shown in my U.S. Pat. No. 3,335,861. Thus, there is provided a base member 11 supported on isolation springs 12 on a plurality of supports 13. Links 14 and springs 15 extend between the base 11 and a frame member 16. Mounted on the base 11 is a vibration generator 17 including a motor 18 drivingly connected by V-belt 19 to a wheel 20 mounted on a shaft carrying an eccentric 21. A crank arm 22 is rotatably mounted on the eccentric at one end and at the other end is connected to a plate 23 carried by the frame member 16.

The frame member 16 carries a trough 24 consisting of a material-carrying surface 25 mounted on the frame member 16 with the material-carrying surface sloping upwardly from a lower end 26 to an upper end 27.

When the vibration generator is operated through energization of the motor 18 the trough vibrates in the direction indicated by the arrow 28 to convey material on the material-carrying surface from the lower end 26 to the upper end 27 of the surface 25.

The trough 24 includes, in addition to the material-carrying surface 25, a pair of sidewalls 30 which extend along each side of the surface 25 from the lower end to the upper end thereof. The upper edges of the sidewalls are generally horizontally arranged but may tilt upwardly slightly as indicated at 31 at the upper end of the material-carrying surface.

The combination of the material-carrying surface 25, the end wall 32, and the sidewalls 30, forms a watertight tank or container open at the end adjacent the upper end 27. The tank is adapted to carry a body of water to quench molten slag exiting from a cupola 33. A slanting guide wall 34 may be provided above the end wall 32 to aid in guiding the slag into the water in the tank. If desired, a bottom portion 35 slanting oppositely to the slope of the material-carrying surface 25 may be provided beneath the area where the slag enters the water to assist initially in moving the slag from left to right as shown in the drawing.

Means are provided to maintain the water in the tank at a predetermined level including an inlet 36 and an outlet or drain 37. The drain 37 is so located as to maintain the level of water in the tank or container below the upper end 27 of the material-carrying surface. Thus, slag which fragments upon being introduced into the water in the tank is carried upwardly along the material-carrying surface 25 by the conveying action and eventually is carried out of the water, i.e., above the level of the drain 37, and in the last few feet of its passage toward the upper end of the material-carrying surface the residual heat of the slag evaporates any moisture carried thereby so that dry and fragmented slag exits from the upper end of the conveyor.

We claim:
1. A slag handling apparatus comprising a vibratory conveyor having a material-carrying upper surface sloping upwardly in the conveying direction from a lower end to an upper end, a water tank on the conveyor with the material-carrying surface forming the bottom of the tank and with said tank having side walls and having an end wall at the lower end of the material-carrying surface and said tank being open at the opposite end thereof, means for maintaining a level of water in the tank with the upper surface of the water at the open end of the tank being below the upper end of the material-carrying surface, and means located above the surface of the water for introducing hot slag into the water in the tank to be cooled thereby and to be conveyed on the material-carrying surface to the upper end thereof.

2. A slag handling apparatus comprising a trough having a material-carrying bottom surface sloping upwardly from a lower end to an upper end, sidewalls on the trough extending from the lower end to adjacent the upper end of said material-carrying surface, the upper edges of the sidewalls being generally horizontal, an end wall extending between the sidewalls at the lower end of the material-carrying surface, said material-carrying surface said sidewalls and said end wall forming a watertight container open at one end, means for maintaining a level of water in the container with the upper surface of the water at said one end of the container being below the upper end of the material-carrying surface, means mounting the trough for vibratory movement, means for vibrating the trough to convey material on the material-carrying surface from the lower end to the upper end thereof, and means for introducing hot slag into the water in the tank to be cooled thereby and to be conveyed on the material-carrying surface to the upper end thereof.

3. A slag handling apparatus comprising a trough having a material-carrying bottom surface sloping upwardly from a lower end to an upper end, side walls on the trough extending from the lower end to adjacent the upper end of said material-carrying surface, the upper edges of the side walls being generally horizontal, an end wall extending between the side walls at the lower end of the material-carrying surface, said material-carrying surface said side walls and said end wall forming a watertight container open at one end, means for maintaining a level of water in the container with the upper surface of the water at said one end of the container being below the upper end of the material-carrying surface, a base, a plurality of springs secured at one end to the lower portion of the trough and at the other end to the base, said springs carrying the trough for vibratory movement, means for introducing hot slag into the water adjacent the lower end of the material-carrying surface, and means for vibrating said trough to convey slag along the material-carrying surface from the lower end to the upper end thereof.

* * * * *